United States Patent Office 2,963,489
Patented Dec. 6, 1960

2,963,489

3,4-FURANDIMETHANOL AND DERIVATIVES

John S. Webb, Warren Township, Somerset County, N.J., assignor to American Cyanamid Company, New York, N.Y., a corporation of Maine No Drawing. Filed July 30, 1953, Ser. No. 371,431

7 Claims. (Cl. 260—347.4)

This invention relates to 3,4-disubstituted furans. More particularly, it relates to 3,4-furandimethanol, esters and ethers thereof and methods of preparing the same.

In the past vitamin $B_6$ (2-methyl-3-hydroxy-4,5-pyridine dimethanol) has been synthesized by the preparation of variously substituted pyridine compounds and subsequent conversion of said substituent groups to those present in the vitamin by numerous and varied processes. Consequently, all of these processes require a number of steps to convert the originally formed substituted pyridine to vitamin $B_6$.

In my copending application, serial number 371,429, filed July 30, 1953, I describe the preparation of 2-aceto-3,4-furandimethanol and esters and ethers thereof which can be converted directly to vitamin $B_6$ by the method described and claimed in my copending application, serial number 371,430, filed July 30, 1953, now U.S. Patent No. 2,732,379. The intermediates used to prepare these compounds are new and are the subject matter of the present application. They may be illustrated by the following structural formula:

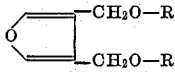

in which R is hydrogen or an alkyl, alkanoyl or aroyl radical.

The compounds of the present invention, in most cases, are liquids at room temperature. They may, however, in some cases be solids with a definite melting point. While 3,4-furandimethanol is soluble in water, the esters and ethers thereof are in general immiscible with or insoluble in water.

In preparing the compounds of the present invention we prefer to start with an ester of 3,4-furan dicarboxylic acid, the preparation of which has been described in the chemical literature. These compounds are then reduced by the use of lithium aluminum hydride or other methods such as catalytic reduction to produce 3,4-furandimethanol. The compound 3,4-furandimethanol can then be converted to various esters and ethers thereof by reaction with, for example, a dialkyl sulfate, an alkanoyl halide or anhydride or an aroyl halide.

The esters and ethers of 3,4-furandimethanol are particularly desirable since they can be acylated with acetic anhydride or acetyl chloride to produce the 2-acetyl-3,4-furandimethanol derivatives. As disclosed in the copending application heretofore mentioned these compounds can be directly converted into vitamin $B_6$.

The temperature at which the process of the present invention may be carried out will vary somewhat with the particular intermediates used. In general, the reaction is carried out in the range of 0° to 125° C. The time required to complete the reaction will vary from a few minutes up to several hours, being dependent upon the temperature and particular intermediate used.

The following examples describe the preparation of 3,4-furandimethanol and esters and ethers thereof. These examples describe in detail the general methods heretofore discussed and are by way of illustration and not limitation.

Example 1

A solution of 37 g. of dimethyl 3,4-furan dicarboxylate (prepared according to the procedure of Alder and Rickert, Ber. 70, 1354) dissolved in 400 ml. of absolute ether is added dropwise during stirring to 15.2 g. of lithium aluminum hydride in 800 ml. of absolute ether over a period of about one hour. The resulting mixture is stirred two hours at room temperature and then 52 ml. of ethyl acetate is added dropwise during rapid stirring. Following this, 125 ml. of water is added dropwise also during rapid stirring. The ether layer is then decanted from the resulting mass of alumina gel and the latter extracted by stirring several minutes each with two 400 ml. portions of ether. The original ether layer and the two extracts are then combined and dried over anhydrous sodium sulfate. Filtration of the drying agent and removal of the ether by distillation on the steam bath leaves a residue of a pale yellow somewhat viscous syrup. This material is vacuum distilled at a pressure of 1 mm. and the fraction boiling at 115°–120° C. collected to give 18.5 g. of 3,4-furandimethanol, a colorless, water soluble syrup with an index of refraction $n_D^{27}=1.5073$.

Example 2

3,4-furandimethanol, 1.9 g., is dissolved in 20 ml. of dry pyridine and benzoyl chloride, 5 ml., is added dropwise to the solution. The resulting mixture is then warmed on the steam bath a few minutes and diluted with 100 ml. of water. The solid which forms is filtered off and washed with dilute sodium carbonate solution. This crude product is crystallized from dilute alcohol to give 2.3 g. of 3,4-bis(benzoxymethyl)furan in the form of long, fine silky filaments having a melting point of 94°–96° C.

Example 3 p-nitrobenzoylchloride, 2.0 g., is added to a solution of 3,4-furandimethanol, 0.5 ml., in dry pyridine, 5.0 ml. The mixture is heated 5 minutes on the steam bath, cooled and diluted with 15 ml. of water. A gum forms which crystallizes on stirring. The solid is filtered off, slurried in 15 ml. of 5% sodium carbonate solution, refiltered, washed and dried to give 1.6 g. of crude 3,4-bis(p-nitrobenzoxymethyl)furan having a melting point of 139°–141°. This material is then recrystallized from isopropyl acetate to give the pure compound which has a melting point of 146°–147° C.

Example 4

3,4-furandimethanol (16 g.), acetic anhydride (50 ml.) and pyridine (0.2 ml.) are heated together on a steam bath for two hours. The resulting mixture is then vacuum distilled at 20 mm. from a steam bath to remove the excess acetic anhydride and the acetic acid formed in the reaction. The residue is then further distilled at a pressure of 0.7 to 0.9 mm. and the material boiling at 104°–106° C. is collected to yield 25.7 g. of 3,4-bis(acetoxymethyl)furan in the form of a colorless oil which has a refractive index of 1.4668 at 26°. On cooling to a low temperature the oil crystallizes to colorless irregular plates which melt at 30°–30.5° C.

Example 5

3,4-furandimethanol, 12.8 g. is mixed with one-third of the solution obtained by dissolving 85% potassium hydroxide, 50 g., in water, 100 ml. To this mixture dimethylsulfate, 13.5 g., is added dropwise during rapid stirring. During the addition the temperature of the reaction is kept in the range of 30°–35° C. by external cooling. When addition of the dimethyl sulfate is complete, one-half of the remaining potassium hydroxide solution is added to the reaction mixture and another 13.5 g. portion of dimethyl sulfate is added dropwise as before. Then the remaining potassium hydroxide solution is added followed by a third 13.5 g. portion of dimethyl sulfate dropwise. This mixture is then stirred at 40°–50° C. for thirty minutes. The reaction mixture is saturated with sodium chloride and extracted with several portions of ether. The extracts are combined and dried over anhydrous sodium sulfate. Removal of the drying agent and solvent leaves 13 g. of nearly colorless oil which is a mixture of 3,4-bis(methoxymethyl)furan and 4-methoxymethyl-3-furanmethanol. The two compounds are separated by fractional distillation at reduced pressure to give pure 3,4-bis(methoxymethyl)furan, boiling point 39–40/0.3 mm., $n_D^{21.5}=1.4608$ and 4-methoxymethyl-3-furanmethanol, boiling point 55–57/0.3 mm., $n_D^{21.5}=1.4802$.

I claim:
1. Compounds of the group having the formula:

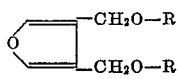

in which R is a member of the group consisting of hydrogen, lower alkyl, lower alkanoyl and aroyl.
2. A 3,4-bis(lower alkanoyloxymethyl)furan.
3. The compound 3,4-furandimethanol.
4. The compound 3,4-bis(benzoxymethyl)furan.
5. The compound 4-methoxymethyl-3-furanmethanol.
6. The compound 3,4-bis(acetoxymethyl)furan.
7. The compound 3,4-bis(methoxymethyl)furan.

References Cited in the file of this patent
UNITED STATES PATENTS

| | | |
|---|---|---|
| 2,502,114 | Witte et al. | Mar. 28, 1950 |
| 2,576,311 | Schlesinger et al. | Nov. 27, 1951 |

OTHER REFERENCES

Blanksma: Rec. trav. chim., vol. 29, pp. 403–406 (1910).
Gilman et al.: JACS, vol. 57, p. 908 (1935).
Middendorp: Rec. trav. chim., vol. 38, p. 39 (1919).
Nystrom et al.: JACS, vol. 69, p. 2548 (1947).
Newth et al.: Research (London), vol. 3, supplement, pp. 50–51 (1950).